(12) United States Patent  
Hunt

(10) Patent No.: US 12,064,928 B2
(45) Date of Patent: Aug. 20, 2024

(54) LAY-UP APPARATUS

(71) Applicant: ROLLS-ROYCE PLC, London (GB)

(72) Inventor: Steven M. Hunt, London (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/618,043

(22) PCT Filed: Jun. 4, 2020

(86) PCT No.: PCT/EP2020/065446
§ 371 (c)(1),
(2) Date: Dec. 10, 2021

(87) PCT Pub. No.: WO2020/249453
PCT Pub. Date: Dec. 17, 2020

(65) Prior Publication Data
US 2022/0305740 A1    Sep. 29, 2022

(30) Foreign Application Priority Data

Jun. 10, 2019 (GB) ..................... 1908265

(51) Int. Cl.
B29C 70/38    (2006.01)
B29C 70/30    (2006.01)
(Continued)

(52) U.S. Cl.
CPC .......... B29C 70/384 (2013.01); B29C 70/342 (2013.01); B29C 70/541 (2013.01)

(58) Field of Classification Search
CPC ....... B29C 70/38; B29C 70/342; B29C 70/30; B29C 70/44
See application file for complete search history.

(56) References Cited

U.S. PATENT DOCUMENTS 3,627,369 A * 12/1971 Nixon ................... B66C 1/0212
                                                        294/189
4,562,033 A * 12/1985 Johnson .............. B29C 37/0064
                                                        156/286
(Continued)

FOREIGN PATENT DOCUMENTS

CN         1442279 A      9/2003
CN       101426637 A      5/2009
(Continued)

OTHER PUBLICATIONS

Nov. 26, 2019—(GB) Search Report—App. No. GB1908265.0.
(Continued)

Primary Examiner — Matthew J Daniels
(74) Attorney, Agent, or Firm — Banner & Witcoff, Ltd.

(57) ABSTRACT

There is disclosed a lay-up apparatus for laying up fibre reinforcement material, the lay-up apparatus comprising a lay-up tool defining a lay-up surface, a placement head having a flexible membrane which is conformable to the layup surface, and a membrane vacuum port extending through the membrane and configured to hold a ply against the membrane when suction is applied through the membrane vacuum port. The placement head is configured to cooperate with the lay-up tool so that when a ply is held against the membrane, an airtight chamber is formed between the membrane and the lay-up tool. The lay-up tool comprises a consolidation vacuum port configured to permit evacuation of the airtight chamber to cause the membrane and ply to move towards the lay-up surface.

18 Claims, 7 Drawing Sheets

(51) Int. Cl.
*B29C 70/34* (2006.01)
*B29C 70/54* (2006.01)

(56) References Cited

U.S. PATENT DOCUMENTS

| | | | | |
|---|---|---|---|---|
| 5,037,599 | A | * | 8/1991 | Olson .................. B29C 70/44 425/389 |
| 5,092,954 | A | | 3/1992 | Braun et al. |
| 5,151,277 | A | | 9/1992 | Bernardon et al. |
| 5,427,518 | A | * | 6/1995 | Morizot ............. B29C 70/541 100/211 |
| 5,648,109 | A | * | 7/1997 | Gutowski ............... B30B 5/02 425/389 |
| 6,425,565 | B1 | * | 7/2002 | Montague ............. F16B 47/00 248/205.9 |
| 8,752,293 | B2 | * | 6/2014 | Jones .................. B29C 70/304 156/196 |
| 2002/0098780 | A1 | * | 7/2002 | Boo .................... B24B 37/30 451/41 |
| 2012/0256348 | A1 | * | 10/2012 | Bergmann ........... B29C 51/085 264/316 |
| 2014/0001682 | A1 | | 1/2014 | Schneiderbauer et al. |
| 2015/0115505 | A1 | | 4/2015 | Jones et al. |
| 2015/0217487 | A1 | | 8/2015 | Louie et al. |
| 2016/0339647 | A1 | | 11/2016 | Matsen et al. |
| 2018/0099462 | A1 | | 4/2018 | Cuenca Rincon et al. |

FOREIGN PATENT DOCUMENTS

| | | |
|---|---|---|
| CN | 104053528 A | 9/2014 |
| CN | 104812556 A | 7/2015 |
| CN | 107521121 A | 12/2017 |
| DE | 19537737 A1 | 4/1997 |
| DE | 10156123 A1 | 5/2003 |
| EP | 0577505 A1 | 1/1994 |
| EP | 3290177 A1 | 3/2018 |
| ES | 2370283 T3 | 12/2011 |

OTHER PUBLICATIONS

Aug. 6, 2020—(WO) International Search Report and Written Opinion—App. No. PCT/EP2020/065446.
Jul. 6, 2023—(CN) Official Action—App 202080042050X.
Jun. 30, 2023—(CN) Search Report—App 202080042050X.

* cited by examiner

LAY-UP APPARATUS

CROSS-REFERENCE TO RELATED APPLICATIONS

This application is a U.S. National Stage Application under 35 U.S.C. § 371 of International Application No. PCT/EP2020/065446, filed Jun. 4, 2020, which claims the benefit of priority to United Kingdom Application No. GB 1908265.0, filed Jun. 10, 2019, and the present application claims priority to and the benefit of the filing date of both of these prior applications, which are incorporated by reference herein in their entireties.

TECHNICAL FIELD

The present invention relates to a lay-up apparatus for laying up fibre reinforcement material, and a method of laying up fibre reinforcement material using the lay-up apparatus.

BACKGROUND

Fibre reinforcement material can be laid up with continuous tape using a placement machine and consolidating with a roller or manually by picking up and placing whole pre-cut plies and consolidating under vacuum after a specified number of plies until a pre-form is formed. The pre-form is placed in an autoclave, which cures the pre-form under pressure and heat.

BRIEF SUMMARY

According to a first aspect, there is provided a lay-up apparatus for laying up fibre reinforcement material, the lay-up apparatus comprising: a lay-up tool defining a lay-up surface; and a placement head having a flexible membrane which is conformable to the lay-up surface, and a membrane vacuum port extending through the membrane and configured to hold a ply against the membrane when suction is applied through the membrane vacuum port; wherein the placement head is configured to cooperate with the lay-up tool to form an airtight chamber between the membrane and the lay-up tool when a ply is held against the membrane (i.e. between the membrane, an opposing surface of the lay-up tool and side walls of the placement head); and wherein the lay-up tool comprises a consolidation vacuum port configured to permit evacuation of the airtight chamber to cause the membrane and ply to move towards the lay-up surface.

The membrane may be configured to seal with a ply of fibre reinforcement material around the vacuum port, when suction is applied through the membrane vacuum port.

The membrane vacuum port may be moveable relative a support structure of the placement head from a ply holding position to a consolidation position, such that the moveable membrane vacuum port further permits the membrane and the ply to conform to the lay-up surface as they move towards the lay-up surface during evacuation of the chamber, when the placement head cooperates with the lay-up tool.

When the placement head cooperates with the lay-up tool, and the vacuum port is in the holding position, the membrane and ply may be spaced apart from the lay-up surface with the airtight chamber disposed between them.

The placement head may comprise a port guide to guide movement of the moveable membrane vacuum port from the ply holding position to the consolidation position.

The moveable membrane vacuum port may be biased to the ply holding position. The membrane vacuum port may be controllably moveable between the ply holding position and the consolidation position to mechanically clamp the ply between the membrane and the lay-up tool in the consolidation configuration.

The lay-up apparatus may comprise a controller configured to control a lay-up operation. The controller may be configured to control movement of the placement head between picking up a ply and cooperating with the lay-up tool.

The controller may be configured to control suction through the membrane vacuum ports to control picking up and holding of a ply against the membrane. The controller may be configured to control evacuation of the airtight chamber through the consolidation vacuum port.

The lay-up tool may comprises heaters for heating the lay-up surface.

The lay-up apparatus may comprise a pick-up tool configured to receive a ply to be picked up by the placement head, and wherein the placement head is configured to cooperate with the pick-up tool so that the membrane of the placement head is in contact with the ply on the pick-up tool.

According to a second aspect, there is provided a method of laying up fibre reinforcement material with a lay-up apparatus of the first aspect, the method comprising: picking up and holding a ply against the membrane of the placement head by applying suction through the membrane vacuum port; moving the placement head to position the ply over the lay-up surface of the lay-up tool, whereby the placement head cooperates with the lay-up tool to form an airtight chamber between the lay-up tool and the membrane; and evacuating the airtight chamber through the consolidation vacuum port in the lay-up tool such that the membrane and the ply conform to the lay-up surface to compact the ply against the lay-up surface.

The method may comprise controlling movement of a membrane vacuum port to the consolidation position to mechanically clamp the ply between the membrane and the lay-up tool after moving the placement head to the lay-up tool and before evacuating the airtight chamber.

The method may comprise heating the lay-up surface during evacuation of the airtight chamber.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments of the invention will now be described by way of example only, with reference to the accompanying figures, in which.

DETAILED DESCRIPTION

Figure 1:
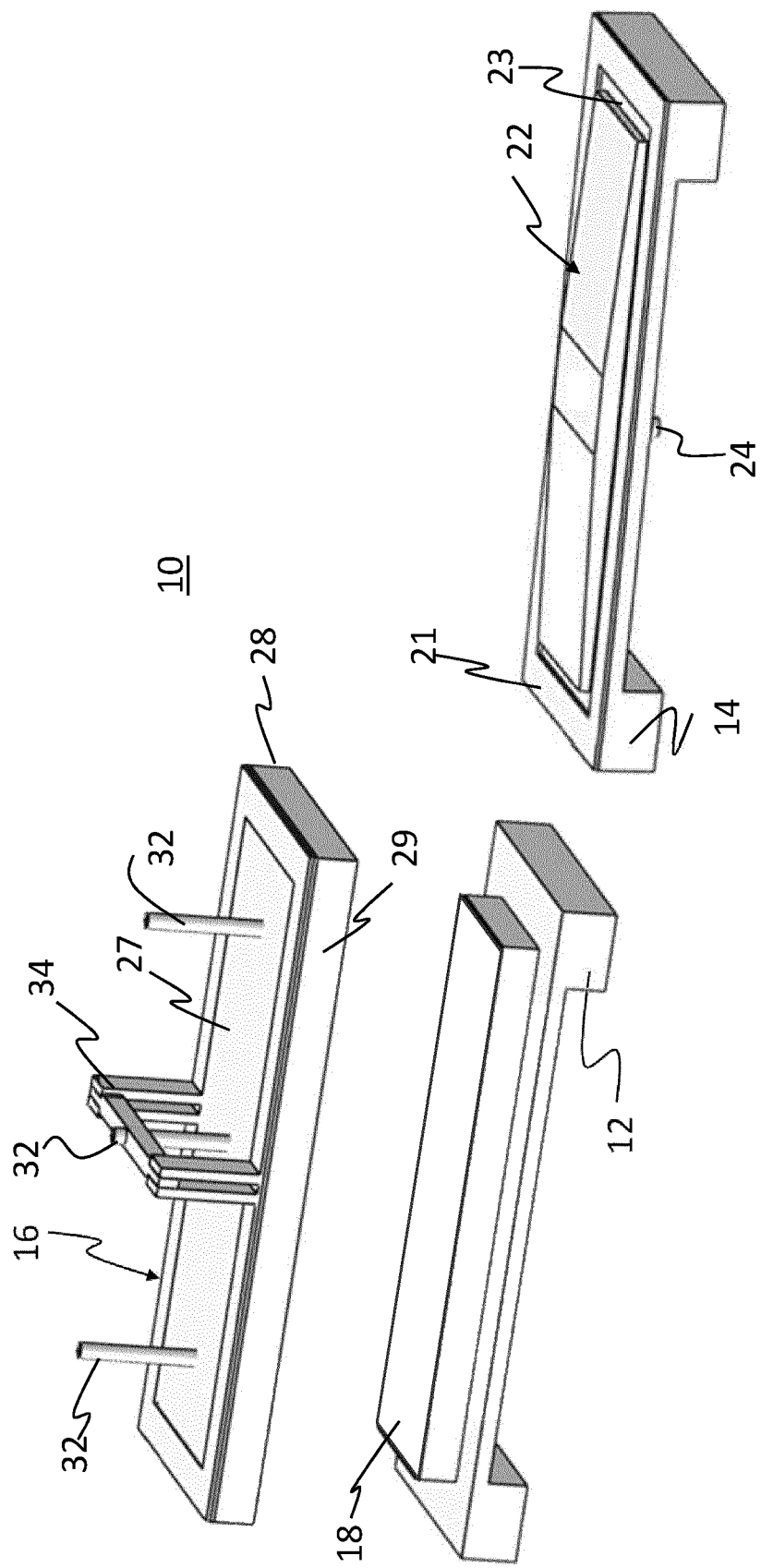
FIG. 1 schematically shows a perspective view of a lay-up apparatus.
Figure 2:
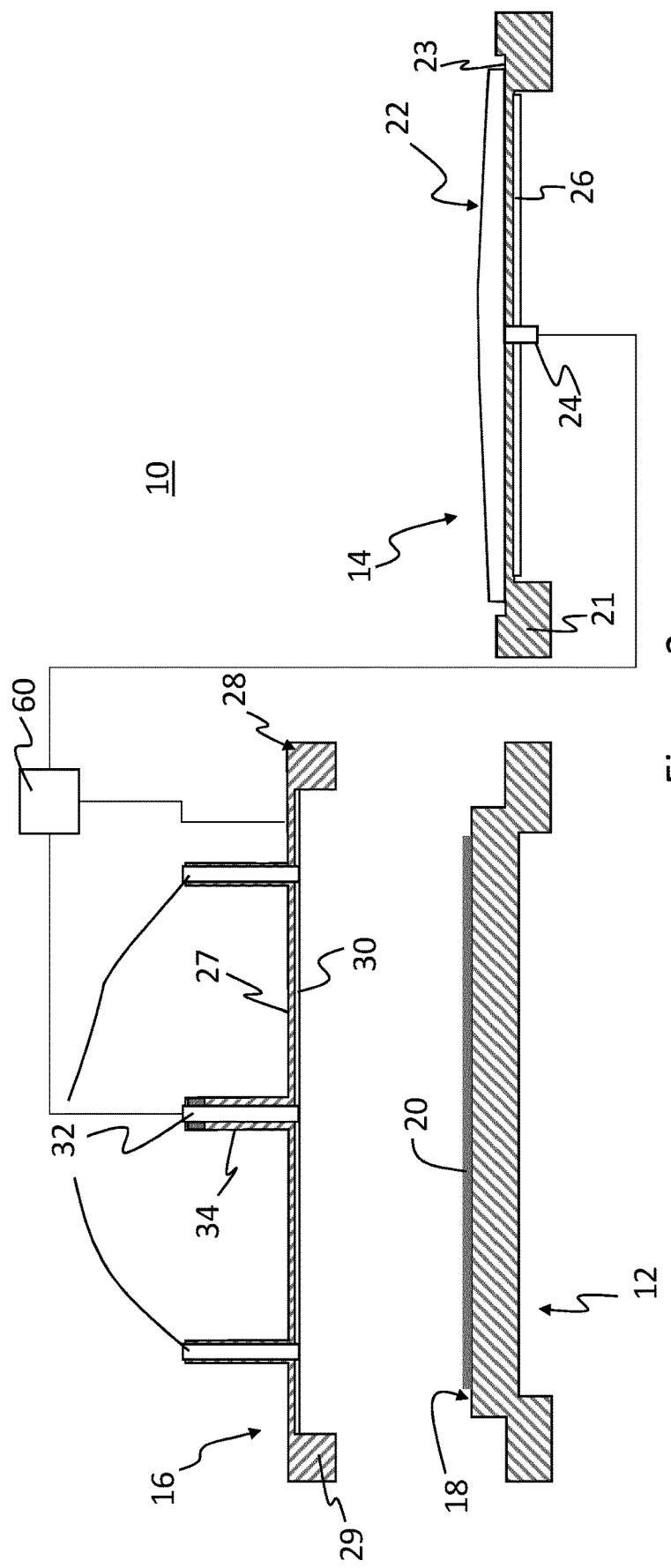
FIG. 2 schematically shows a cross-sectional view of the lay-up apparatus.

FIGS. 1 and 2 show a lay-up apparatus 10 comprising a pick-up tool 12, a lay-up tool 14 and a placement head 16.

The pick-up tool 12 comprises a pick-up surface 18 configured to receive a ply 20 to be picked up in a lay-up operation (described with reference to FIG. 3 below). In this example, the ply 20 is a layer of fibre reinforcement material provided with a disposable backing layer, such as a film of plastic. FIG. 2 shows the pick-up tool 12 with a ply 20 received on the pick-up surface 18, with the backing layer of the ply 20 disposed on an opposing side to the pick-up surface 18. In this example, the pick-up surface 18 is planar (i.e. flat) so as to be able to receive a flat ply 20 without distorting the ply 20, such as by wrinkling, folding or bridging.

The lay-up tool 14 comprises a lay-up surface 22 which in this example has a different profile to the pick-up surface 18 of the pick-up tool 12. The lay-up surface may have a complex three-dimensional profile. In this example, the lay-up surface 22 diverges downwards from a central portion such that the central portion of the lay-up surface 22 is higher than outer portions of the lay-up surface 22. In other examples, the lay-up surface may have any three-dimensional profile. The lay-up surface 22 is configured to receive a ply 20 such that it conforms to the profile of the lay-up surface 22.

The lay-up tool 14 comprises a lay-up support 21 which encloses the lay-up surface 22, with a consolidation recess 23 disposed between the lay-up support 21 and the lay-up surface 22.

The lay-up tool 14 comprises two consolidation vacuum ports 24 which extend from a surface of the consolidation recess though the lay-up tool 14. The consolidation vacuum ports 24 are configured to be connected to a vacuum pump or other low pressure source so that air can be drawn from above the lay-up surface 22 through the consolidation vacuum port 24. In other examples, there may be more or fewer consolidation vacuum ports, and they may be disposed in any suitable location in the lay-up tool.

In this example, the lay-up tool 14 further comprises heaters 26 (shown in FIG. 2) which are configured to heat the lay-up tool 14 to thereby heat the lay-up surface 22. The heaters 26 are positioned below the lay-up surface 22. In other examples, the heaters 26 may be positioned anywhere on the lay-up tool 14. A heated lay-up surface 22 may impart heat to a ply 20 laid up on the lay-up surface 22, thereby improving the consolidation of the ply 20, during a lay-up operation.

The placement head 16 comprises a support structure 28 and a flexible membrane 30 which is conformable to a surface. In this example, the support structure 28 is in the form of a housing having an open end so as to define a partially-enclosed cavity and be configured to partially receive the pick-up tool 12 or the lay-up tool 14. In this simplified example, the housing is generally cuboidal with an upper plate 27 and downwardly projecting sides 29, with an open lower end. The support structure 28 surrounds the membrane 30, and the membrane 30 is attached at its periphery to the sides 29 of the support structure 28 near to the upper plate 27. In other examples, the support structure may be of any suitable shape.

The membrane 30 is elastic and made from silicon. In some examples, the membrane may be made from rubber, or any other elastic material. In other examples, the membrane may not be elastic, and may be merely flexible.

The placement head 16 further comprises a plurality of membrane vacuum ports 32 which extend through the membrane 30, away from the enclosed space, and through openings in the plate 27 of the support structure 28. In this example, there are three membrane vacuum ports 32 arranged in a line. In other examples, there may be more or fewer membrane vacuum ports, and they may be arranged in any suitable configuration.

The membrane vacuum ports 32 are configured to be connected to a vacuum pump so that air can be drawn from below the membrane 30 (i.e. from the enclosed space side of the membrane 30) through the respective membrane vacuum port 32. The placement head 16 is configured to hold a ply 20 against the membrane 30 when suction is applied through the membrane vacuum ports 32.

The membrane vacuum ports 32 are configured so that a seal is formed between a ply 20 of reinforcement material and the membrane 30 around the membrane vacuum port 32 when suction is applied through the membrane vacuum port 32. The seal may be formed between the backing layer of the ply 20 and the membrane 30 when present, or between the ply and the membrane. This enables the ply 20 to be picked up by the placement head 16 without the need for suction cups, with the membrane acting to provide more uniform support to the ply than may be provided by spaced apart suction cups alone. In some examples, the membrane vacuum ports may terminate with suction cups configured to form a seal with a ply. In other examples, the membrane vacuum ports may extend through the membrane and terminate with a plate on an inner surface of the membrane. In such examples, the membrane vacuum ports may be configured so that a seal is formed between a ply of reinforcement material and the plate of the membrane vacuum port.

The placement head 16 is configured to cooperate with the pick-up tool 12 such that the membrane 30 comes into contact with the backing layer of a ply 20 disposed on the pick-up surface 18 of the pick-up tool 12. Therefore, when the placement head 16 is cooperating with the pick-up tool 12, it can pick up a ply 20 disposed on the pick-up surface 18 and hold it against the membrane 30 by applying suction through the membrane vacuum ports 32.

The placement head 16 is configured to cooperate with the lay-up tool 14 by forming a seal between the projecting sides 29 of the support structure 28 and the lay-up support 21 of the lay-up tool 14. Therefore, when a ply 20 is held against the membrane 30 of the placement head 16, thereby sealing the membrane vacuum ports 32 in the membrane 30, and the placement head cooperates with the lay-up tool 14, an airtight chamber 50 is formed between the membrane 30 and the lay-up tool 14 (best shown in FIGS. 5-7).

In this example, the membrane vacuum ports 32 of the placement head 16 are moveable relative the support structure 28 between a ply holding position and a consolidation position. The membrane vacuum ports 32 may be pivotable within the openings of the plate 27 of the support structure 28, and are linearly movable through the openings of the plate 27.

Figure 4:
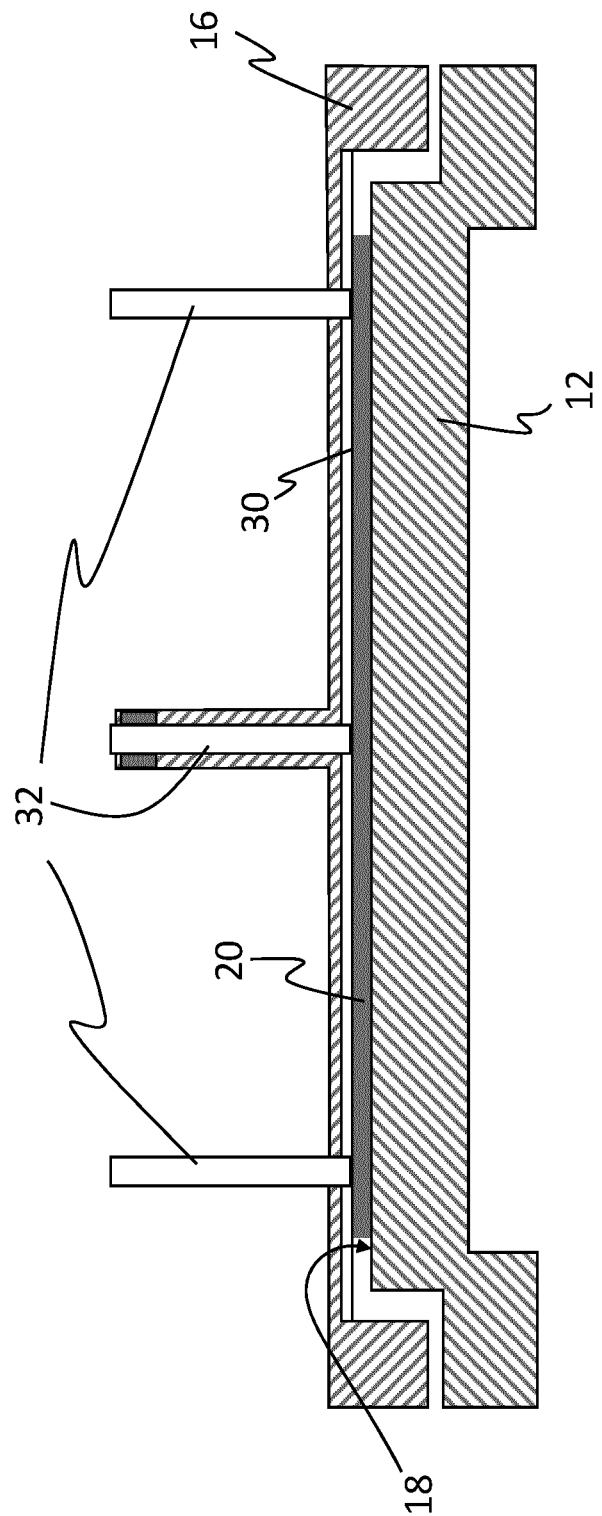
FIGS. 4-7 schematically show cross-sectional views of the lay-up apparatus at various stages during the lay-up operation.
Figure 5:
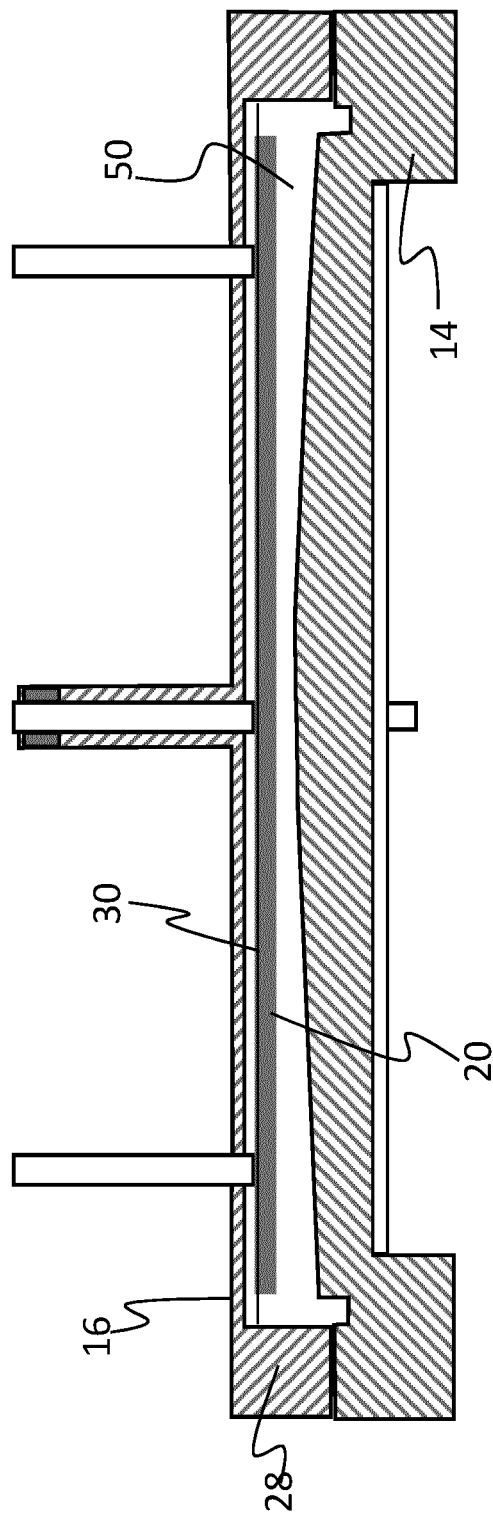
Figure 7:
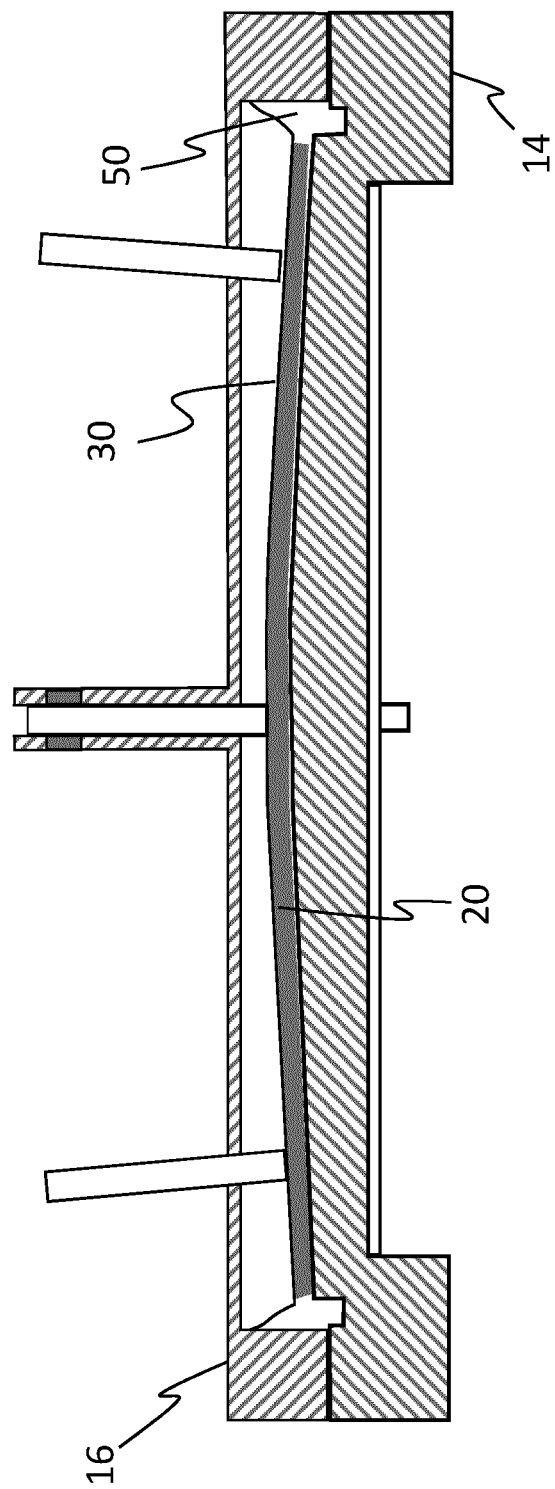

FIGS. 4 and 5 shows each of the membrane vacuum ports 32 in respective ply holding positions. In this example, each of the vacuum ports is configured that when all of the vacuum ports are in their respective ply holding positions their openings are aligned in a common plane so that they can easily pick up a ply 20 from the flat pick-up surface 18 of the pick-up tool 12. FIG. 7 shows each of the membrane vacuum ports 32 in respective consolidation positions. The consolidation position of a vacuum port 32 is the position when it is compacting a ply 20 against the lay-up surface 22 of the lay-up tool 14, or against plies laid up on the lay-up tool 14. The consolidation position in this example corresponds to the respective ports not being aligned in a common plane. It will be appreciated that there may be any number of consolidation positions corresponding to the position of respective ports when compacting a ply.

Having a plurality of freely moveable membrane vacuum ports 32 allows the membrane 30 to more precisely conform to a surface, such as the lay-up surface 22, as the membrane 30 is not constrained by its attachment to the membrane ports 32. In this example, all three of the membrane vacuum ports 32 are movable relative the support structure 28. In some examples, none of the membrane vacuum ports may be moveable relative the support structure or only some of the membrane vacuum ports may be moveable relative the support structure.

In this example, the support structure 28 comprises a port guide 34 which is configured to guide the central membrane vacuum port 32 to constrain it to linear movement. The port guide 34 comprises linear protrusions from the plate 27 and a guide bar coupled to the central membrane vacuum port 32 and cooperating with the linear protrusions. In some examples, there may be more than one port guide, or the port guide may be omitted. In other examples, a port guide may be coupled to any one or to more than one of the membrane vacuum ports.

Figure 6:
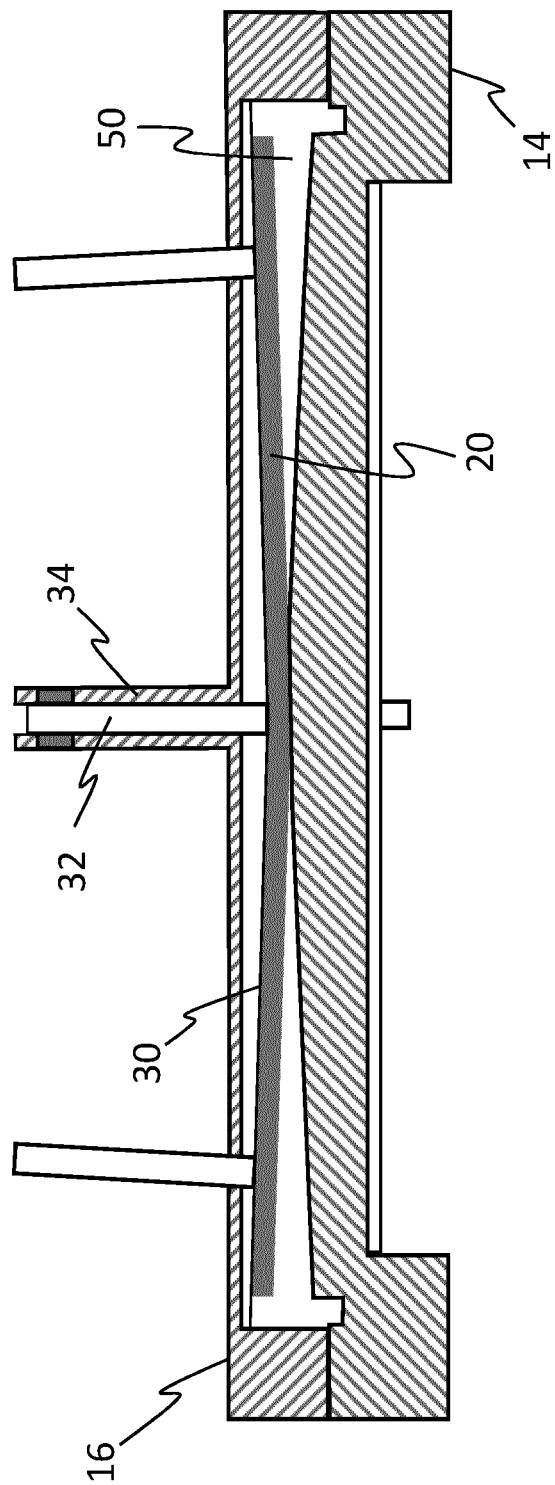

In this example, the port guide 34 also comprises driving means (not shown) to controllably move the central membrane vacuum port 32 between its ply holding position and the consolidation position. The controllable movement of the membrane vacuum port 32 enables the placement head 16 to mechanically clamp a ply 20 between the membrane 30 and the lay-up surface 22 of the lay-up tool 14, when the placement head 16 is cooperating with the lay-up tool 14 (as shown in FIG. 6). In some examples, the membrane vacuum port may be controllably moved to clamp a ply between the membrane and the pick-up tool to pick up a ply from the pick-up tool. In other examples, there may be no driving means.

In this example, the movable membrane vacuum ports 32 are biased to the ply holding position, so that when they are induced to move away from the ply holding position by an external force, they return to the ply holding position once the external force is removed. The vacuum ports may be biased by virtue of being coupled to the membrane, which may be an elastic material biased to return to a substantially planar form when returned in the placement head.

In this example, lay-up apparatus 10 further comprises a controller 60. The controller 60 is configured to control movement of the placement head 16 and to control suction through the consolidation and membrane vacuum ports 24, 32. The controller 60 also controls movement of the driven membrane vacuum port 32 (i.e. the central membrane vacuum port in this example) to mechanically clamp a ply layer 20 between the membrane 30 and the lay-up surface 22.

Figure 3:
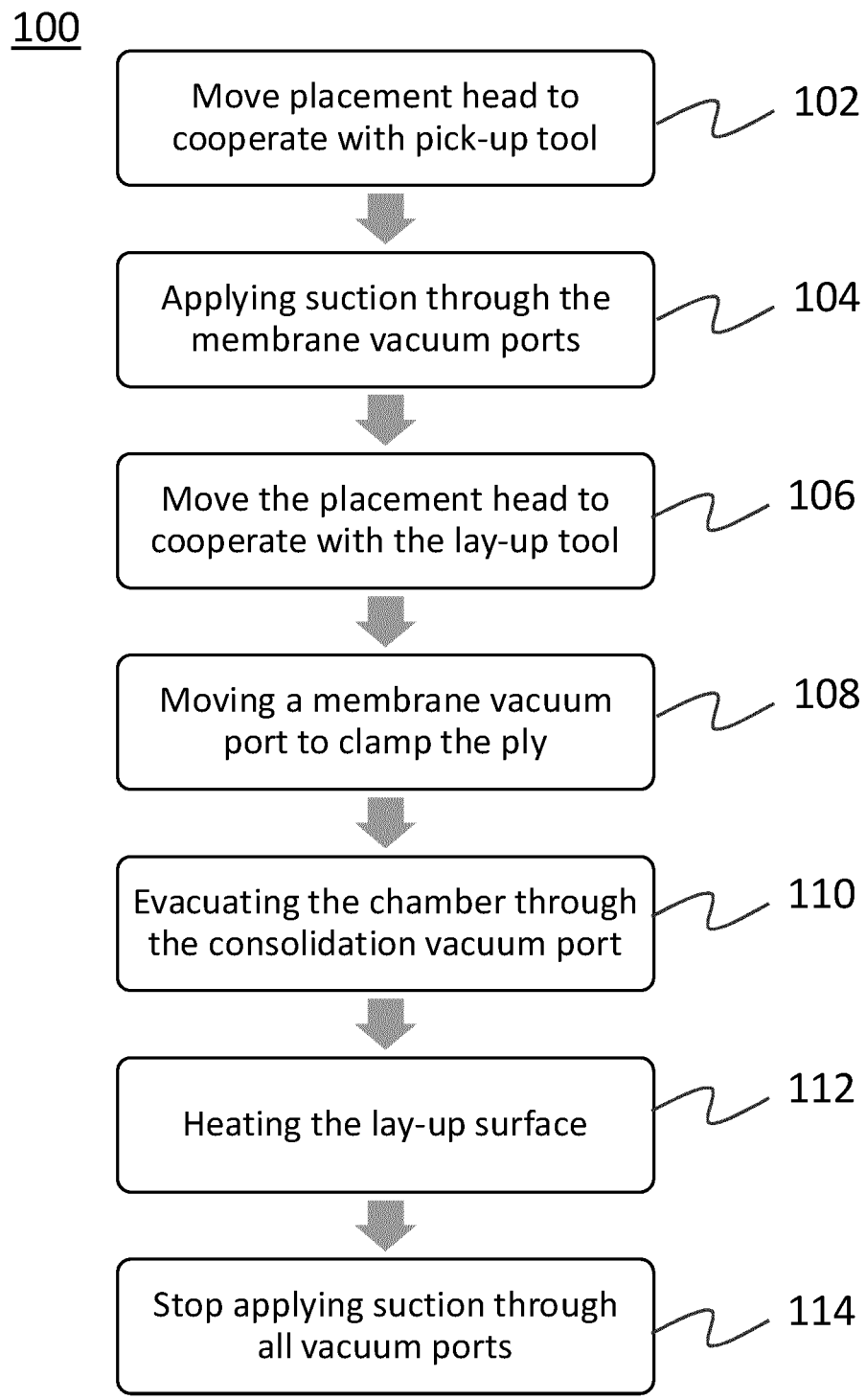
FIG. 3 is a flow chart showing steps of a method of laying up fibre-reinforcement material in a lay-up operation using the lay-up apparatus.

FIG. 3 is a flow chart showing steps of a method 100 of performing a lay-up operation to lay up fibre reinforcement material using the lay-up apparatus 10.

At the beginning of the lay-up operation, a ply 20 is disposed on the pick-up surface 18 of the pick-up tool 12 with the backing layer disposed on the surface opposing the pick-up surface 18. In box 102, the method includes moving the placement head 16 to cooperate with the pick-up tool 12 as shown in FIG. 4. As explained above, when the placement head 16 cooperates with the pick-up tool 12, the membrane 30 is in contact with the backing layer of the ply 20.

In box 104, the method comprises applying suction though the membrane vacuum ports 32 so that a seal is formed between the backing layer of the ply 20 and the membrane 30 around each of the membrane vacuum ports 32. The seal ensures that a vacuum is formed between the ply 20 and the membrane 30 around the vacuum ports 32, such that the ply 20 is held against the membrane while suction is applied through the membrane vacuum ports 32.

In box 106, the method comprises moving the placement head 16 to cooperate with the lay-up tool 14 as shown in FIG. 5. Since the ply 20 is held against the membrane 30 by the suction through the membrane vacuum ports 32, the ply 20 is carried with the placement head 16 to the lay-up tool 14.

When cooperating with the lay-up tool 14, with a ply 20 held against the membrane 30, the placement head 16 forms an airtight chamber 50 between the membrane 30 and the lay-up tool 14. The projecting sides 29 of the support structure 28 form a seal with cooperating surfaces of the lay-up tool 14 with an O-ring or other suitable seal, to thereby form the airtight chamber 50.

In box 108, the method comprises driving the central membrane vacuum port 32 to move from the ply holding position to the consolidation position, such that it clamps the ply 20 between the membrane 30 and the lay-up tool 14, as shown in FIG. 6.

In box 110, the method comprises applying suction through the consolidation vacuum port 24 of the lay-up tool 14 to evacuate the chamber 50. Since suction is still being applied through the membrane vacuum ports 32, the ply 20 is sealed against the membrane 30. Therefore, the membrane 30 is forced to deform and move towards the lay-up surface 22 to conform with the lay-up surface, thereby forcing the ply 20 to conform with the lay-up surface 22 as shown in FIG. 7. In this example, the membrane vacuum ports 32 move freely to a consolidation position under force of the vacuum (i.e. through the consolidation vacuum port) to permit more precise conformance.

The membrane 30 therefore compacts the ply 20 against the lay-up surface to de-bulk the ply 20. In some examples, the lay-up surface may be a top layer of a ply or of a plurality of plies which have already been laid up.

In box 112, during evacuation of the chamber 50, the heaters 26 heat the lay-up tool 14 so that the lay-up surface 22 is heated, thereby transferring heat to the ply 20 on the lay-up surface 22. This improves consolidation of the ply 20 on the lay-up surface 22.

In box 114 the method comprises stopping applying suction through the consolidation and membrane vacuum ports 24, 32 when the ply 20 has been compacted. Stopping applying suction through the membrane vacuum ports 32 breaks the seal between the ply 20 and the membrane 30 such that the ply 20 is no longer held against the membrane 30.

Stopping applying suction through the consolidation vacuum port 24 permits venting of the chamber 50 so that air may re-enter the chamber 50 (i.e. through the port or an alternative passageway, which may be selectively opened). The membrane vacuum ports 32 are biased to the ply holding position, and therefore return to the ply holding position when the vacuum in the chamber 50 is released.

The placement head 16 can now be moved away from the lay-up tool 14, and the backing layer can be removed from the ply 20. The lay-up operation 100 may then be repeated as many times as necessary to form a pre-form, and to de-bulk each ply layer 20 which is applied to the lay-up tool 14.

When the last ply 20 is laid up and the pre-form is formed, the lay-up tool 14 may be placed in an oven or autoclave to cure the pre-form.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A lay-up apparatus for laying up fibre reinforcement material, the lay-up apparatus comprising:
    a lay-up tool defining a lay-up surface; and
    a placement head comprising a support structure having downwardly projecting sides and an open lower end, a membrane which is flexible and conformable to the lay-up surface, and a membrane vacuum port extending through the membrane and configured to hold a ply against the membrane when suction is applied through the membrane vacuum port, wherein the membrane is surrounded by the downwardly projecting sides and connected to the support structure at an inward side of the downwardly projecting sides;
    wherein the placement head and the lay-up tool are configured to cooperate by engagement between the lay-up tool and the downwardly projecting sides of the support structure to form an airtight chamber between the membrane and the lay-up tool when a ply is held against the membrane; and
    wherein the lay-up tool comprises a consolidation vacuum port configured to permit evacuation of the airtight chamber to cause the membrane and ply to move towards the lay-up surface.

2. The lay-up apparatus according to claim 1, wherein the membrane is configured to seal with a ply of fibre reinforcement material around the membrane vacuum port, when suction is applied through the membrane vacuum port.

3. The lay-up apparatus according to claim 1, wherein the membrane vacuum port is moveable relative a support structure of the placement head from a ply holding position to a consolidation position, such that the membrane vacuum port further permits the membrane and the ply to conform to the lay-up surface, as they move towards the lay-up surface during evacuation of the airtight chamber, when the placement head cooperates with the lay-up tool.

4. The lay-up apparatus according to claim 3, wherein the placement head comprises a port guide to guide movement of the membrane vacuum port from the ply holding position to the consolidation position.

5. The lay-up apparatus according to claim 3, wherein the membrane vacuum port is biased to the ply holding position.

6. The lay-up apparatus according to claim 3, wherein the membrane vacuum port is controllably moveable between the ply holding position and the consolidation position to mechanically clamp the ply between the membrane and the lay-up tool, when the placement head cooperates with the lay-up tool.

7. The lay-up apparatus according to claim 1, further comprising a controller configured to control a lay-up operation.

8. The lay-up apparatus according to claim 7, wherein the controller is configured to control movement of the placement head between picking up a ply and cooperating with the lay-up tool.

9. The lay-up apparatus according to claim 7, wherein the controller is configured to control suction through the membrane vacuum port to control picking up and holding of a ply against the membrane.

10. The lay-up apparatus according to claim 7, wherein the controller is configured to control evacuation of the airtight chamber through the consolidation vacuum port.

11. The lay-up apparatus according to claim 1, wherein the lay-up tool comprises heaters for heating the lay-up surface.

12. The lay-up apparatus according to claim 1, further comprising a pick-up tool configured to receive a ply to be picked up by the placement head, and wherein the placement head is configured to cooperate with the pick-up tool so that the membrane of the placement head is in contact with the ply on the pick-up tool.

13. The lay-up apparatus according to claim 1, wherein the lay-up tool further comprises a recess located between an outer edge of the lay-up tool and the lay-up surface.

14. The lay-up apparatus according to claim 1, wherein the lay-up tool further comprises a lay-up support enclosing the lay-up surface, and a consolidation recess disposed between the lay-up support and the lay-up surface.

15. The lay-up apparatus according to claim 1, wherein the downwardly projecting sides define a partially-enclosed cavity configured to partially receive the lay-up tool.

16. A method of laying up fibre reinforcement material with a lay-up apparatus of claim 1, the method comprising:
    picking up and holding a ply against the membrane of the placement head by applying suction through the membrane vacuum port;
    moving the placement head to position the ply over the lay-up surface of the lay-up tool, whereby the placement head cooperates with the lay-up tool to form an airtight chamber between the lay-up tool and the membrane; and
    evacuating the airtight chamber through the consolidation vacuum port in the lay-up tool such that the membrane and the ply conform to the lay-up surface to compact the ply against the lay-up surface.

17. The method according to claim 16, comprising controlling movement of a membrane vacuum port to a consolidation position to mechanically clamp the ply between the membrane and the lay-up tool after moving the placement head to the lay-up tool and before evacuating the airtight chamber.

18. The method according to claim 16, comprising heating the lay-up surface during evacuation of the airtight chamber.

* * * * *